Oct. 18, 1955  B. G. PRICE  2,721,110
TUBING CALIPERS
Filed May 25, 1953  5 Sheets-Sheet 2

Berry Glenn Price
INVENTOR.

BY Thomas O Arnold
ATTORNEY

Oct. 18, 1955   B. G. PRICE   2,721,110
TUBING CALIPERS
Filed May 25, 1953   5 Sheets-Sheet 3

Berry Glenn Price
INVENTOR.

BY Thomas O. Arnold

ATTORNEY

United States Patent Office 2,721,110
Patented Oct. 18, 1955

2,721,110

TUBING CALIPERS

Berry G. Price, Houston, Tex., assignor to Tuboscope Company, Harris County, Tex., a corporation of Texas Application May 25, 1953, Serial No. 357,275

1 Claim. (Cl. 346—49)

This invention relates to recording calipers and more particularly to means for measuring and recording variations in internal diameter or in the internal surface of pipes such as tubing or casing used in oil wells.

Oil and gas well tubing sometimes becomes corroded and eroded by the passage of well fluids or well tools of various kinds therethrough. Other conditions or treatment of the tubing may cause general variations in diameter or cause the tubing to assume an oval rather than circular cross-section.

Heretofore, instruments have been made for the purpose of indicating certain information about the internal conditions of the pipe, but all instruments previously in existence suffer from rather serious limitations in the information they make available. Moreover, some of the information obtained from prior calipers is misleading and false, in that the indication of certain conditions which do not affect strength of the pipe are indistinguishable from indications of conditions which seriously impair strength.

This invention encompasses a recording caliper which measures and makes a record of many conditions of tubing or other pipe which have not heretofore been determinable, and which distinguishes several types of defects that were heretofore indistinguishable, thereby making it possible for an operator to know more accurately the condition of his tubing or pipe.

In accordance with the present invention, the caliper is run through the pipe or tubing. If the pipe or tubing is situated in a well, the device may be lowered on a wire line and caused to make a record of variations in the internal diameter of the pipe as it is being pulled out of the well. Alternatively the device may be fitted with appropriate packers and pumped through a string of tubing which is filled with fluid, or the device may be moved through tubing by other means; but the description herein will be restricted, for illustrative purposes, to the running of the tool in a well on a wire line.

An object of this invention is to provide novel means for calipering internal conditions of pipe whereby corrosion pits may be detected and at the same time distinguished from other pipe conditions.

A further object of this invention is to provide novel means whereby localized changes of diameter may be detected and distinguished from other pipe conditions.

Another object of this invention is to provide novel means whereby an oval cross section of pipe, ring grooves, deposits of scale, generalized corrosion, and other conditions may be detected and distinguished from each other and from other pipe conditions.

Yet another object of this invention is to provide novel means whereby the depth, character and seriousness of a particular flaw may be determined.

Other objects will appear more fully from the following description and accompanying drawings.

These objects are accomplished in accordance with this invention by providing a caliper with an elongated body or housing carrying a plurality of feelers which are adapted to follow variations in the inside surface of said pipe, and means for separately and simultaneously recording inward and outward movement of the feelers.

Figure 1:
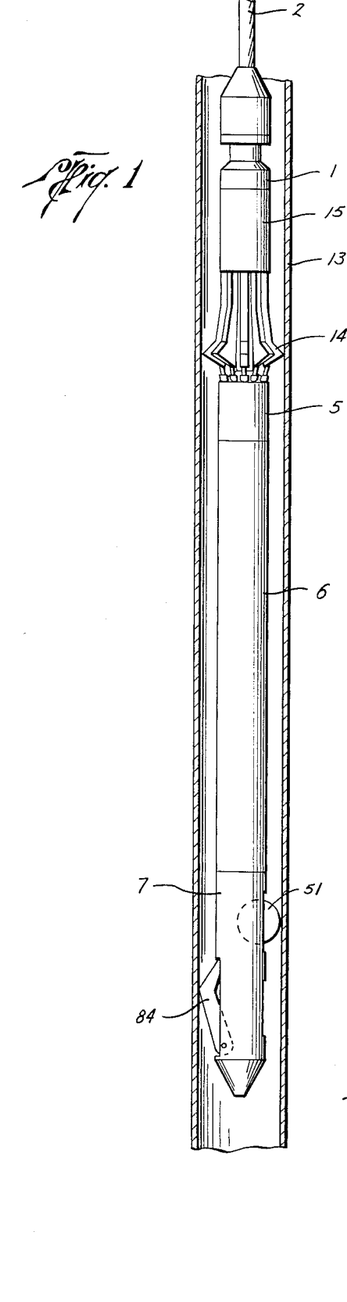
Figure 1 is an elevational view of the caliper positioned in a length of vertical tubing.

The general external appearance of a preferred embodiment of the invention is shown in Figure 1. The body of the instrument may be indicated generally as comprising a top or cap 1 (see Figure 2) adapted for connections to a wire line 2, a feeler mandrel 3 secured to and extending downward from the cap 1, a mandrel flange 4 at the lower end of the mandrel 3 (see Figure 3), a follower housing 5 of cylindrical form extending downward from the flange 4, an external body cylinder 6 detachably secured to the lower end of the follower housing 5, and a drive and drive release housing 7 (see Figure 4). The drive housing 7 is the lowermost body member and is detachably secured to the lower end of the external cylinder 6. (See Figures 2, 3 and 4.)

Inside of and concentric with the external body cylinder 6, there are three cylinders which may be characterized, from top to bottom, as the linkage housing 10, the recorder housing 11, and the gear housing 12.

During calipering operations the calipering tool is suspended in and more or less centered in pipe or tubing 13 (see Figure 1) being calipered by means hereinafter discussed.

Means are provided for detecting variations in the surface of the pipe 13 and for detecting changes in the diameter thereof. Conveniently this may take the form of a feeler assembly illustrated in Figures 2 and 2A. As aforesaid, the cap 1 supports the feeler mandrel 3.

Figures 2, 2A:
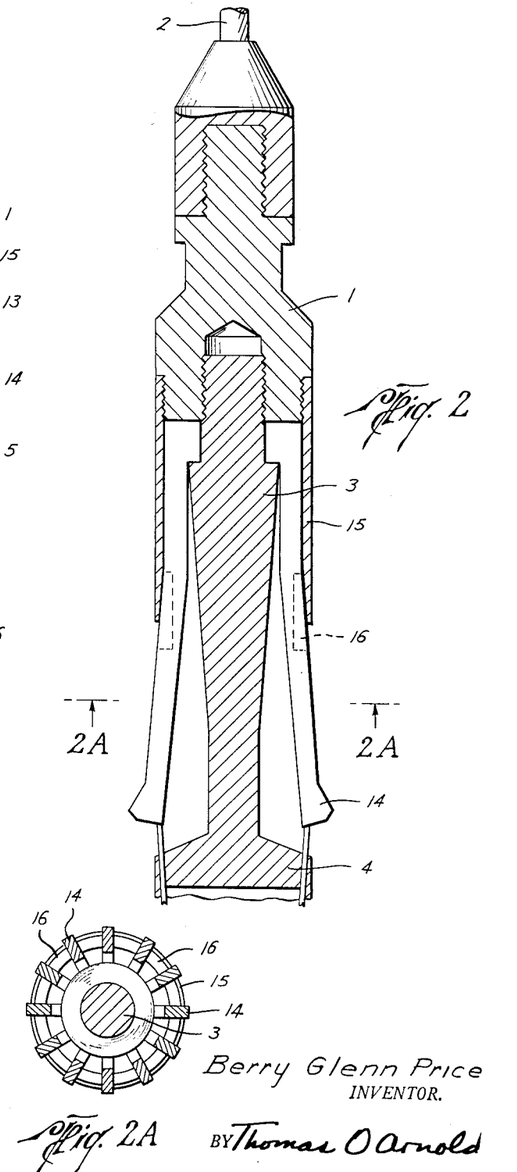
Figure 2 is a diagrammatic sketch, partially in section, showing the upper or feeler end of the caliper tool.
Figure 2A is a section taken along line 2A—2A of Figure 2, showing the feelers and feeler spacers.

Surrounding the upper end of said feeler mandrel 3 is a plurality of leaf spring feelers 14. Conveniently, the feelers 14 may be formed from a single cylinder which is subjected to a series of radial cuts every few degrees around the circumference of the cylinder, such cuts extending from the lower end of the cylinder to within about a half inch or so from the top thereof, so that the various leaf spring feelers 14 remain integrated in one piece at the top. This one piece assembly of feelers 14 may be hereinafter referred to as a feeler head.

A shoulder may be provided near the upper end of the feeler head to cooperate with a shoulder on the mandrel 3, and the feeler head may be further rigidly secured to the upper end of the feeler mandrel 3 by a sleeve 15 which fits over the upper end of the feeler head.

Alternatively, the various feelers may be made separately and assembled into the arrangement above described and shown in Figures 2 and 2A.

The lower ends of the feelers 14 are adapted to move radially (i. e. laterally with respect to the tool body) inward and outward. The practical limit of their inward motion is determined by contact with the feeler mandrel 3 near the middle thereof; the limit of their outward motion is determined by the sleeve 15. Conveniently there may be feeler spacers 16 affixed to the sleeve 15 and fitting in between the flat faces of the feelers 14 to prevent excessive feeler motion in a sideways direction.

In order to simplify the drawing, the feelers 14 have been shown to be comparatively thick and the space in between them to be quite substantial. The preferred tool, however, will have thin feelers and only a very small space between them so that as many feelers as possible may be crowded into the circle. The structure here disclosed permits many more feelers than prior art structures wherein feelers protruded out through slots in a cage. Applicant has found 30 feelers to be practical in a caliper constructed for use in 2½ inch tubing, as compared to a maximum of about 18 feelers in prior art calipers of the same size.

Adjacent the lower end and on the outside edge of the feelers 14, tungsten carbide points are mounted. These points are adapted to make sliding contact with the surface of the pipe 13. The spring action of the body of the feelers operates to urge the feeler points into any pits or other variations in the pipe surface. It is important to note that the feelers 14 move independently so that one or more feelers may move outward into cavities in the pipe surface while others remain stationary and still others are moved inward by scale formation, all at the same time.

Below the lower end of the feelers 14 the feeler mandrel 3 is secured to the cylindrical follower housing 5 by the mandrel flange 4.

Means responsive to movement of the feelers 14 are provided and are housed substantially within the follower housing 5. Such means may take the form of a plurality of followers 17 which are adapted to follow the movement of the lower end of the feelers 14. The followers 17, in the preferred embodiment illustrated, are of roughly L shape with the vertical shaft of the L extending through holes in the mandrel flange 4 and making sliding contact with the lower edge of the feelers 14.

The lower edge of the feelers 14 are so cut that the followers 17 move downward when the feelers 14 move outward, and upward when the feelers move inward. Conveniently the angle may be selected so that the total movement of the followers 17 is substantially less than, though proportional to, the motion of the feelers 14. An angle of 14 degrees with the horizontal has been found to be satisfactory. Each follower 17 is urged upward by its own follower spring 18 positioned thereunder. In alternative embodiments there may be only one follower for each two or three feelers, but in the preferred embodiment illustrated there is a follower 17 for each feeler 14.

Figure 3:
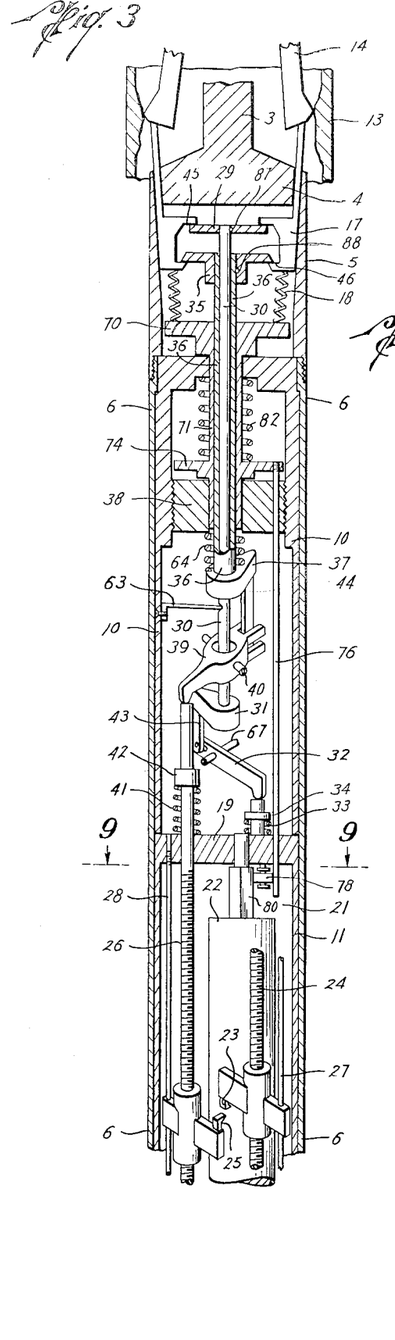
Figure 3 is an elevational view, partially in section, showing the central portion of the caliper, the caliper being positioned in a pipe with a scale build-up condition.

Means for recording selected feeler movements are provided. In the embodiment illustrated the recording mechanism is located within the chart housing 11. A baffle 19 at the upper end of the chart housing 11, and a baffle 20 at the lower end of the chart housing define a chart chamber 21. In other embodiments the recording means may be of a different form and may be located at the surface of the well or at some other convenient place.

In the recording mechanism illustrated, however, there is a tubular chart 22 removably mounted on a chart mandrel (not shown). The chart mandrel is rotatably mounted in bearings positioned respectively within the baffle 19 and the baffle 20a.

A first stylus 23 is carried by a first lead screw 24; a second stylus 25 is carried by a second lead screw 26. The two lead screws 24 and 26 are actually part of two communicating linkages to be described below, but they extend all the way through the chart chamber 21 and the baffles 19 and 20 at either end of the chart chamber 21, and they serve as the carriage for the two stylus 23 and 25.

The chart 22 and the two lead screws 24 and 26 are adapted to be rotated by means hereinafter described. When so rotated, the two stylus 23 and 25 move along their respective lead screws in the same direction, each marking a line on the chart 22. Since the chart is rotating simultaneously, each stylus scribes a line of generally helical form on the chart. Conveniently the points of the two stylus are positioned so that the two helical lines will be only a few thousandths of an inch apart. As will be seen below, the motion of the two stylus which is provided by the rotation of their respective lead screws is only one of two components of motion to which the two stylus are subjected.

In order to hold the two stylus 23 and 25 in contact with the chart while the lead screws 24 and 26 are being rotated, two stylus guide rods 27 and 28 are placed in the chart chamber 21 extending from the baffle 19 to the partition 20, and passing through the nonscribing ends of their respective stylus 23 and 25.

Means for communicating the selected feeler movements to the recording mechanism are provided. In the preferred embodiment illustrated, such means take the form of two mechanical linkages which are responsive to movements of the followers 17. In embodiments wherein the recording mechanism is located remotely, electrical or other communicating means are preferred.

The first communicating linkage includes a collar 29, mounted on top of an inner spindle 30. The linkage is completed to the first lead screw 24, as detailed in Figure 8, by an offset 31 with depending arm 43, said offset 31 being secured to the bottom of the inner spindle 30, and a rocker arm 32 connecting the depending arm 43 to the upper end of the first lead screw 24.

Figures 8, 9, 10:
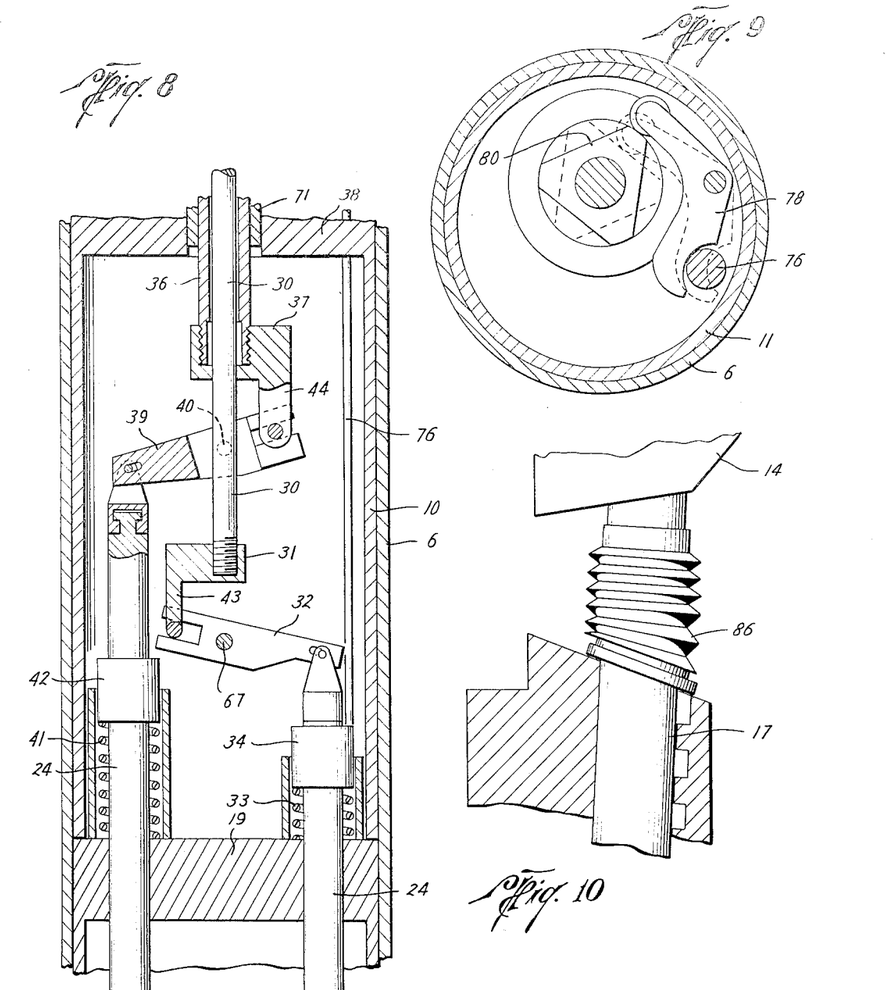
Figure 8 is a detail of the middle portion of one embodiment of the two follower linkages.
Figure 9 is a detail in horizontal section taken along line 9—9 in Figure 3.
Figure 10 is a detail of the Sylphon seals used on the followers.

The joint between the rocker arm 32 and the lead screw 24 is flexible to permit the lead screw 24 to rotate and the rocker arm 32 to rock with freedom. Figure 3 illustrates a simple contact point structure used in a preferred embodiment; Figure 8 details a type of pin-slot and swivel joint combination which may be used in an alternative embodiment to permit the multiple flexibility.

Between the ends of the rocker arm 32 is a rocker pin 67 which is secured to the linkage housing 10.

The first lead screw 24 is urged downward by a small tension lead screw spring 33 positioned between and secured to the baffle 19 and an appropriate collar 34 adjacent the upper end of the lead screw 24. In the embodiment illustrated in Figure 8, this downward urging of the lead screw 24, communicated through the rocker arm 32, effects an upward urging of the collar 29 so that it will follow the motion of the followers 17.

In the embodiment shown in Figure 3, wherein the connection between the rocker arm 32 and the lead screw 24 takes the form of a simple contact point, spring tension is applied to the linkage on each side of that contact point. Conveniently an additional spring may be provided in the form of a leaf spring 63 secured to the linkage housing 10 and to the inner spindle 30 and adapted to urge the inner spindle 30 upward.

The second communicating linkage comprises a collar 35 mounted on top of a tubular outer spindle 36, an offset 37 with depending arm 44, and a rocker arm 39 which engages the top of the second lead screw 26 in some manner such as the alternatives described for the first linkage. The outer spindle 36 surrounds the inner spindle 30, and is within and concentric with a hat sleeve 71, hereinafter further described, which is slidably mounted in an opening in the upper end of the linkage housing 10, and in an opening in the guide baffle 38. The two spindles 30 and 36 are slidable with respect to each other and with respect to said guide baffle 38.

The rocker arm 39 rocks on a rocker pin 40 which is secured to the linkage housing 10. The lead screw 26 is urged upward by a compression spring 41 positioned between the baffle 19 and an appropriate collar 42 on the lead screw 26. As indicated in the description of the first linkage, no further linkage spring is needed in the embodiment shown in Figure 8, but an additional compression spring 64 positioned between the guide baffle 38 and the offset 37 is utilized in the embodiment illustrated in Figure 3 wherein a simple contact point is used to communicate motions of the rocker arm 39 to the second lead screw 26.

In accordance with this invention, the communicating linkages select certain feeler movements, which are expressed in follower movements, to be communicated to the recording mechanism. The first communicating linkage selects the motion of the follower 17 which is at any given time the lowermost follower. To accomplish this, the followers 17 are provided with down-bearing surfaces 45 which are adapted to engage the upper surface of the collar 29 of the first linkage, and to move the collar 29 downward whenever one or more followers move downward in response to outward movement of a feeler 14.

If the lowermost follower moves upward, the collar 29 follows it upward until that follower stops or until the collar 29 engages some other follower which is either stationary or moving downward. The collar 29 moves upward and downward, following and in response to the upward and downward movements of the lowermost follower 17. Thus the motion of the lowermost follower 17 is selected and this motion is communicated by the first linkage to the first stylus 23.

Similarly, the second communicating linkage selects the motion of the follower 17 which at any time may be the uppermost follower 17. To accomplish this, the followers 17 are also provided with up-bearing surfaces 46 which are adapted to engage the lower surface of the collar 35 of the second linkage and to move the collar 35 upward whenever one or more followers move upward in response to inward movement of a feeler 14. The collar 35 moves upward and downward, following and in response to upward and downward movements of the uppermost follower. Thus the motion of the uppermost follower 17 is selected, and this motion is communicated by the second linkage to the second stylus 25.

Figure 5:
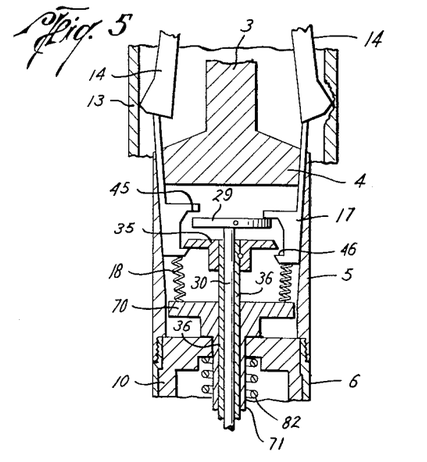
Figure 5 is an elevational view, partially in section, showing the position taken by the feelers, followers, and associated parts when the caliper is in pipe with a deep corrosion pit on one side.

Figure 5 shows the position taken by the collars 29 and 35 when one follower is down further than another. Figure 2 shows the position of the two collars 29 and 35 when all followers are in about the same position.

It should be noted that the springs in the feelers 14 are strong enough to overcome the opposition from the follower springs 18; and the follower springs 18 are sufficiently strong to overcome the opposition of the lead screw springs 33, 63, 41 and 64. If desired the rocker arms 32 and 39 may be pivoted closer to one end than the other, thereby becoming multipliers which either amplify or reduce the movement of the stylus in response to the feelers.

Also, the mass of the linkages above the rocker arms may be proportioned to the mass of the linkage below the rocker arm so that the linkages are dynamically as well as statically balanced. This eliminates motion of the linkages in response to jars on the caliper as it is moved through the pipe, thereby avoiding false indications on the chart.

It is seen from the above paragraphs that a second component of motion, i. e. a component which is responsive to feeler movements, is imparted to each stylus in addition to its motion axially of the chart, imparted by the rotation of the respective lead screws.

Figure 4:
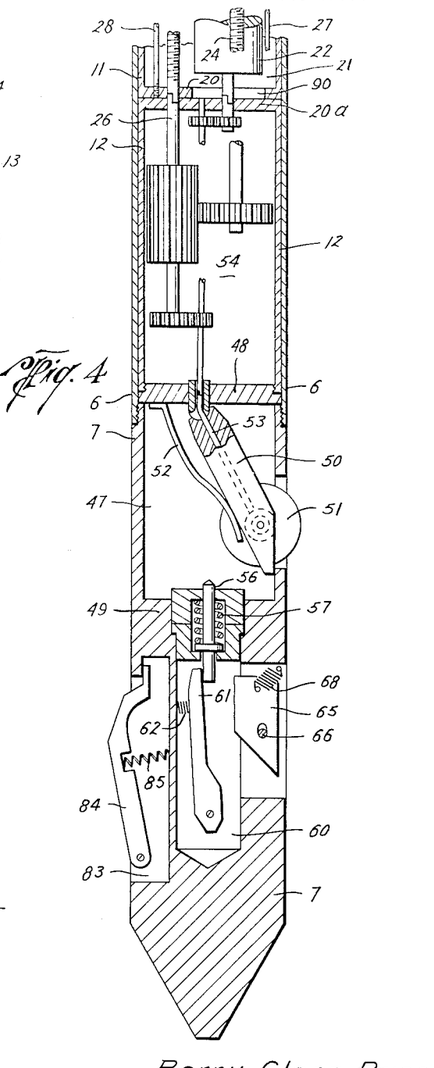
Figure 4 is an elevational view, partially in section, showing the lower end of the caliper.

Means for driving the recording mechanism are provided. A drive chamber 47 is provided in the lowermost body member 7, heretofore characterized as the drive and drive release housing. The upper end of the drive chamber 47 is defined by a baffle 48 affixed to the cylindrical gear housing 12; the lower end of the drive chamber is defined by a baffle 49 which divides said lowermost body member 7 into two halves.

Depending from the baffle 48 there is a hinged arm 50 which carries at its lower end a drive wheel 51. During calipering operations, the wheel 51 is urged by a spring 52 to protrude from the cylindrical lower body member 7 and engage the surface of the pipe 13. The hinged arm 50 may extend beyond the lower edge of the drive wheel 51 so as to engage the body member 7 and thereby limit the outward protrusion of the wheel 51.

As the caliper is moved through the pipe, the drive wheel 51 is rotated by its contact with the pipe 13. This motion is communicated by a flexible drive shaft 53 to a gear box 54. Alternatively a rigid drive shaft equipped with a universal joint may be used.

The gear box or chamber 54 is defined by the baffle 48 on the bottom, the cylindrical gear housing 12 on the sides, and a baffle 20a on top. Appropriate gearing and connections are placed in the gear box 54 to cause the two lead screws 24 and 26 and the chart 22 to rotate at predetermined speeds whenever the drive wheel 51 is rotating.

When pipe is being calipered in a well, it is necessary to both lower the caliper into the well and pull it out. Preferably, therefore, means are provided for preventing the operation of the drive mechanism until the caliper has been lowered into the well and its direction of movement is reversed to commence a calipering run upward. This may take the form of a one way clutch (not shown) in the drive shaft 53 leading from the drive wheel 51 to the gear box.

Figure 6:
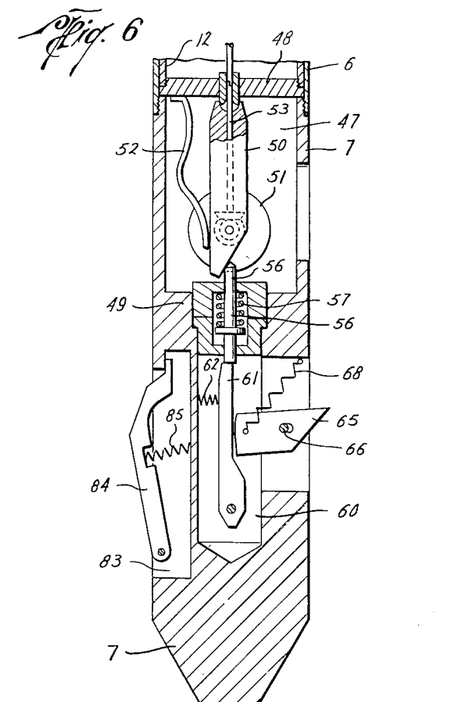
Figure 6 is an elevational view showing the lower end of the caliper with the drive mechanism retracted for lowering into a well.

In the embodiment illustrated, however, the drive wheel 51 is made retractable to the position shown in Figure 6, completely within the drive chamber 47. Any convenient means may be used to hold the drive wheel 51 retracted. As shown in Figure 6, a pencil like catch 56 may be slidably mounted in a vertical position in the baffle 49 and adapted to protrude into the drive chamber 47 and engage the protruding end of the hinged arm 50. The catch 56 is urged downward by a compression spring 57, however, and must be held up to hold the hinged arm 50 in the retracted position.

Therefore, the catch 56 extends through the baffle 49 into a release chamber 60 immediately therebelow. Near the bottom of the release chamber 60, the lower end of a lever 61, standing in a substantially vertical position, is pivoted. The lever 61 is free to assume either of two positions: It may stand vertically directly beneath the catch 56 so as to hold it upward; or it may be tilted slightly to one side, to the left in Figures 4 and 6, so as to permit the catch 56 to move downward and release the wheel 51. A compression spring 62 urges the lever 61 into the vertical position when the catch 56 is moved upward.

A pawl 65, pivoted on a pin 66 secured to the lower body member 7, is provided to kick the lever 61 to the tilted position when the direction of motion of the caliper changes. The pawl 65 is equipped with a point adapted to protrude from the body member 7 as shown in Figure 6. When the pawl 65 is approximately horizontal with the point protruding outward and preferably pointing slightly upward, and when the lever 61 is in the vertical position, the end of the pawl opposite the point fits against the side of the lever 61 (see Figure 6). As the caliper is lowered into the well, the pawl 65 slides on the surface of the pipe, occasionally tilting slightly in the counter-clockwise direction when pipe joints or collars are passed.

The pawl's upper corner, that upper corner which is against the lever 61, is rounded so that such counter-clockwise rotation will not move the lever 61. The pawl point is so shaped that the counter-clockwise rotation will prevent any possible jamming or locking of the pawl in a tool joint or corrosion pit during the descent of the caliper.

When the direction of movement of the caliper is changed, however, and the caliper is pulled upward, the pawl point engages the surface of the pipe 13, catching in the first rough place or the crevice between two joints of pipe, and the pawl is turned clockwise.

Considering the pawl when the point is pointing outward and slightly upward as aforesaid, the lower of the two corners of the pawl which rests against the lever 61 is squared. Therefore, any clockwise rotation of the pawl 65 kicks the lever 61 to the tilted position and permits the catch 56 to drop, thereby releasing the wheel 51.

When the pawl 65 has been turned clockwise through a small arc, a pawl spring 68 operates to turn the pawl clockwise a full 90 degrees into a vertical position shown in Figure 4 so that it is out of the way and no longer protrudes from the caliper. Additional freedom of movement of the pawl may be provided by providing a small slot in the pawl for the pawl pin 66 to slide in.

The opening in the lowermost body member 7 through which the pawl 65 protrudes may be made large enough to permit the insertion of a finger or pencil into the release chamber 60. The drive mechanism can then be cocked into the retracted position by pressing the drive wheel 51 inward, moving the catch 56 upward with a pencil, and turning the pawl to the horizontal position shown in Figure 6. The lever 61 will be urged into the vertical position by the spring 62 when the catch 56 is moved upward.

It is preferable for the feelers 14 to be retracted when the caliper is lowered into the well, just as the drive wheel 51 is retracted during this lowering operation. The mechanism whereby this is accomplished is shown in Figure 3, but is better illustrated in Figures 7 and 9.

The feelers 14 are pressed inward by hand or by an auxiliary sleeve (not shown) which can be pressed down over the outside of the entire caliper. The followers 17 are then moved upward to an extreme upward position so that the upper ends thereof are almost at the points of the feelers (see Figure 7). In this position the followers can hold the feelers in.

Figure 7:
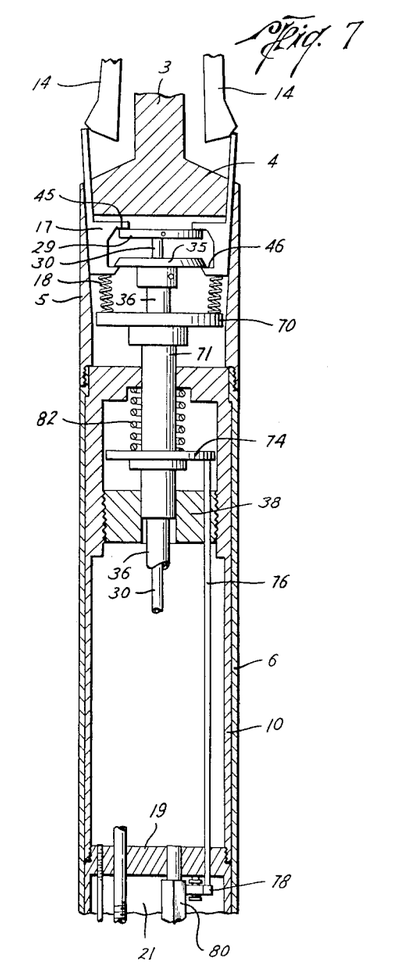
Fig. 7 is an elevational view of the central portion of the caliper showing the feelers in retracted position for lowering into a well.

A first or upper hat 70 is positioned beneath the follower springs 18 and adapted to be moved upward under those springs until they are fully compressed, so as to hold the followers 17 in the extreme up position. The hat 70 is mounted on a hat-sleeve 71, concentric with and on the outside of the second linkage outer spindle 36.

A second or lower hat 74 is mounted on the same hat-sleeve 71 below said upper hat 70, and is secured to a cam rod 76 which traverses the length of the linkage housing 10 and penetrates through the baffle 19 to engage a cam follower 78 and be held up thereby.

In order to release the feelers 14 to move outward and commence their normal operation, a cam 80 (see Figures 7 and 9) is provided at the upper end of the chart mandrel shaft. Conveniently, the cam 80 may be of generally triangular form with blunt points as shown in Figure 9. The cam follower 78 is of the rocker arm type, pivoted on a vertical pin depended from the baffle 19.

On the upper end of the cam follower 78 as viewed in Figure 9, there may be a roller adapted to follow the cam 80; the opposite end of the cam follower is a bearing surface on which the cam rod 76 bears when the roller is at or near the center of one side of the triangular cam 80, as when the caliper is made up for service.

When the direction of movement of the caliper in the pipe is changed and the drive wheel 51 is released to engage the pipe and commence rotating, the chart shaft and cam 80 thereon also rotate. The roller end of the cam follower 78 moves outward as the point of the triangular cam 80 approaches, thereby moving the opposite end of the cam follower 78 inward and removing it from under the cam rod 76. A hat spring 82 is positioned to urge the lower hat 74 downward, thereby driving the cam rod 76 down beside the cam follower. The hat-sleeve 71 and upper hat 70 move downward with the lower hat 74, thereby releasing the extreme compression on the follower springs 18.

The feelers 14, which are activated by springs stronger than the follower springs 18, thereupon move the followers down to operating position. The feelers 14 then move outward and commence normal calipering operating.

Reference has been made, hereinabove, to the fact that the spring action of the feeler arms 14 is stronger than the follower springs 18. In alternative embodiments, it may be found desirable to adjust the spring ratios so that the vertical force exerted by a single feeler spring falls off as the feeler moves outward to the extent that the force of a single feeler spring becomes less than the force exerted by a single follower spring 18 when the feeler is somewhat extended. Such a spring ratio introduces certain errors in the calipering of deep pits, but it also serves to limit overkick of the instrument when a number of feelers move out simultaneously.

When calipering operations are in progress, it is preferable that the caliper be more or less centered in the pipe being calipered. The action of the spring feelers 14 suffices to keep the upper end of the caliper sufficiently centered. The lower end of the caliper, however, is urged to one side by the spring force on the drive wheel 51.

To counterbalance this, a recess 83 is cut in the lower body 7 opening to the side of the caliper opposite the drive wheel 51. Within this recess a centering lever 84 is hingedly mounted and adapted to protrude from the caliper to make sliding contact with the surface of the tubing 13. Behind the centering lever 84 a centering lever spring 85 of strength comparable to the drive wheel spring 52 is fitted to urge the centering lever 84 outward.

The centering lever performs the further function of keeping the lower end of the caliper to one side of the tubing 13 during the lowering of the caliper into the well so that the pawl 65 will be sure to engage when upward movement of the caliper is begun.

Well fluids and grit often suspended therein tend to hamper efficient operation of the instrument if permitted to penetrate into the mechanisms which are positioned within the body cylinder 6. Therefore, Sylphon seals 86, or other sealing means, are placed around each follower 17, as detailed in Figure 10, and the entire body of the instrument is filled with oil. The oil keeps the mechanisms within the instrument clean and lubricates them. It also provides a fluid damping of possible overkick of the linkages that might occur if a large number of feelers moved simultaneously.

Preferably an additional seal is provided around the drive shaft 53 where it passes through the baffle 48. If this seal is absolute, then other means (not shown) should be provided to relieve the hydraulic pressures that will be built up within the body when followers move downward. For example, instead of filling every corner of the instrument with oil, an air pocket may be left. Alternatively, a bellows expansion chamber (not shown) may be used or the seal in the baffle 48 around the drive shaft 53 may be only a partial seal so that fluids may leak thereby to relieve hydraulic pressures within the system.

In the embodiment shown, it is necessary to open the tool to insert and remove charts. This breaking open of the caliper is facilitated by constructing the collars 29 and 35 to be detachable from their respective spindles 30 and 36. Conveniently, the collars 29 and 35 and their respective spindles 30 and 36 are equipped with stiff ball and socket snaps 87 and 88 respectively (see Figure 3) which secure the collars in place for normal operation while making removal of the collars easy when the tool is broken open.

Also, the sides of the collar 35 are tapered inward and the diameter of the lower edge is only very slightly greater than the diameter of the circle formed by the lower ends of the followers 17 when they are in the extreme up position. This permits the collar 35 to be forced upward through said circle when the caliper is being made up.

The caliper is broken open by unscrewing the follower housing 5 from the body cylinder 6 and pulling the two parts apart. The followers 17 may be held in place by hand pressure just below the feelers 14. The two collars 29 and 35 snap free from their respective spindles 30 and 36. The follower springs 18 may be adapted to separate either from the followers 17 or from the upper hat 70. After separation of the follower housing 5 from the body cylinder 6, one or more followers 17 may be dropped sufficiently to permit tilting and removal of the collars 29 and 35, whereupon they are again snapped in place on their respective spindles.

In the embodiment illustrated in Figure 3, the linkage housing may then be pulled out. The linkages part at the contact joints therein. See Figure 3.

The recorder housing 11 may then be removed. The two lead screws 24 and 26 and the chart shaft part between the two baffles 20 and 20a. An opening 90 is provided in the baffle 20 through which the chart 22 may be removed.

After the caliper has been so opened, the drive wheel 51 is turned backwards until the lead screws have reached the bottom of their travel and is stopped at a position so that the roller on the cam follower 78 is near the center of one side of the triangular cam 80. A new chart is inserted. The linkage housing 10 is placed on top of the recorder housing 11. The cam rod 76 sticks through the baffle 19 and comes to rest on the bearing surface of the cam follower 78. The linkage housing 10 and recording housing 11 are placed in the body cylinder 6.

The follower housing 5 is placed on top of the body cylinder 6 and screwed on. As the follower housing 5 is secured, it moves downward and the collar 35 snaps through the lower ends of the followers 17. The linkage housing 10 is pushed down on top of the recorder housing 11, but the cam rod 76 is prevented from moving down by the cam follower 78. The cam rod 76 therefore pushes the lower hat 74 upward. The lower hat 74 in turn moves the upper hat 70 upward to compress the follower springs 18 to the fullest extent. If the feelers 14 are moved inward by hand or by an auxiliary sleeve adapted to fit over the outside of the entire instrument, the followers 17 assume the position illustrated in Figure 7 whereby they hold the feelers 14 in.

The drive mechanism is cocked as hereinbefore described and the caliper is run down a well on a wire line and then pulled upward again. As the caliper moves upward, the pawl 65 engages the first connection between joints of pipe, and the drive wheel 51 is released to engage the surface of the pipe. The chart shaft and triangular cam 80 therein turn in response to the turning of the drive wheel, forcing the cam follower 78 to rock clockwise until the cam rod 76 is released to drop down beside the cam follower 78. The feelers 14 are released and begin to follow variations in the pipe surface.

The two stylus 23 and 25 begin to scribe their helical lines on the chart. However, the upper helical line, scribed by the first stylus 23 is varied in response to every movement of the feeler which is outermost at any given time; and the lower helical line, scribed by the second stylus 25, is varied in response to every movement of the feeler which is innermost at any given time.

Alternatively, the spring tensions may be adjusted so that the simultaneous movement of a selected number of followers 17 is required to activate either of the two stylus. For example, if the strength of the linkage springs 41 and 64 is such that the simultaneous force of two follower springs 18 is required to activate the stylus, then the chart is indicative not of a single small bump on the internal surface of the tubing, but only of a dent or of general scaling which is encountered by two feelers simultaneously.

Similarly, if the strength of the linkage springs 33 and 63 together with the strength of the follower springs 17, is such that the simultaneous force of the spring action of two feelers 14 is required to activate the stylus, then the chart is indicative not of a single small pit which is not likely to cause failure, but only of a multiplicity of pits or a single large pit which is engaged by two feelers 14.

Thus, the response of either stylus, or both, may be made to be cumulative of the movements of a selected number of feelers. The response thereby becomes a more accurate indication of total lost metal than in the case where a single feeler's movement in response to a single small pit or bump is recorded, and the indication of total metal lost out of corrosion pits, or total area affected by scale, is a more accurate indication of likelihood of tubing failure.

It is further noted that when any feeler moves into a pit, the force exerted by that feeler on the body of the caliper is decreased, thereby creating an unbalance in the forces tending to center the feeler end of the tool. This unbalance causes the tool to shift off center. Bowed tubing and certain other conditions may also cause the tool to move off center. When the tool is in this off center position, the feeler which is farthest out does not necessarily measure the depth of the deepest pit. If the feeler which is farthest out happens to be on the side of the tool which is away from the tubing wall, then the chart indication effected by that feeler is greater than the true depth of the pit into which the feeler has moved.

Similarly, if the feeler which is farthest out happens to be on the side of the tool which is closest to the tubing wall, then the chart indication effected by that feeler is less than the true depth of the pit into which the feeler has moved.

In certain embodiments of calipers, therefore, it may be found desirable to include a centering device which will keep the caliper more effectively centered. Preferably, the centering device should act through the feelers themselves. The centering device disclosed in United States Patent Number 2,518,663 is of this type and can be readily adapted for use on this invention.

The interaction of the feelers, because of the shift of the caliper body to an off center position when one or more feelers moves outward, makes the feelers "dependent" in one sense of the word. The chart indication is dependent upon the position of the caliper in the tubing, as well as the depth of the pit into which a feeler moves. However, each feeler may move alone into a pit or depression, regardless of any consequent movement of other feelers and/or the caliper body which may accompany such movement of a feeler into a pit. The word "independent" as used in this specification, therefore, is to be construed as defining such individual action of a feeler in moving into a pit, and is not to be construed as negativing simultaneous movement of the instrument body, and consequently of other feelers, due to the unbalance of forces brought about by the outward movement of one or more feelers into pits or depressions.

Figures 11 through 18 illustrate typical pipe conditions and the patterns formed by the two helical lines in response to the indicated pipe conditions.

If for any reason a portion of pipe has been distorted so as to have an oval cross section, some of the feelers move outward, stretching across the long diameter of the oval and causing the upper helical line to move upward. Other feelers are forced inward to conform to the short diameter of the oval and cause the lower helical line to move downward. When the area of distortion is passed, the lines return to their normal helical pattern. The distortion is indicated on the chart by the pattern illustrated in Figure 11.

Figure 11:
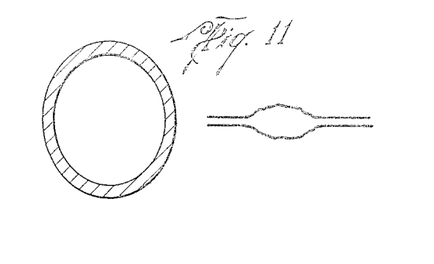
Figure 11 is a cross sectional view of an oval pipe section, together with the caliper indication of that defect.

It should be noted that this pipe condition, even when coupled with a general but slight corrosion sufficient to roughen the surface of the pipe, is not a serious condition likely to cause pipe parting or other failure. In all existing calipers, however, this condition, particularly when coupled with a rough pipe surface, gives the same indication on the chart as severe corrosion over a substantial area—a most serious condition necessitating immediate removal of the subject length of pipe. It is seen that this invention eliminates the useless and costly expense of removing from a well a length of pipe that was in no danger of failing.

Figure 12:
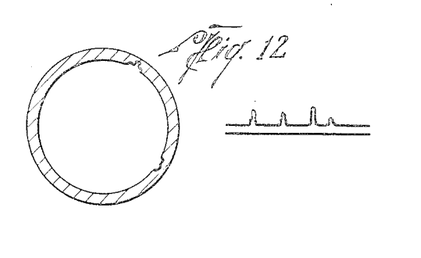
Figure 12 is a cross sectional view of pipe containing scattered jagged corrosion pits together with the caliper's indication of that defect.

Scattered pitting in the pipe is detected through outward movement into the pits of individual feelers. This movement causes pips to be scribed in the upper helical line as shown in Figure 12. The pips are of such height, width and location on the chart as to be indicative of the depth, width and location of the subject corrosion pit. The lower line remains true to its helical form. It is obvious that when spring tensions are adjusted so that the stylus responds only to the cumulative movement of more than one feeler and follower, then pips will appear only when more than one corrosion pit is encountered at the same time.

Figure 13:
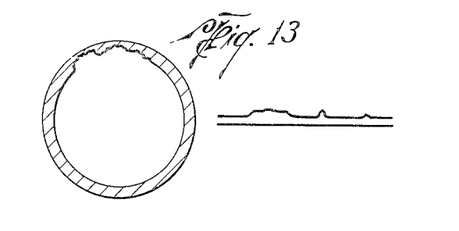
Figure 13 is a cross sectional view of general corrosion on one side of the pipe together with the caliper's indication of that type of defect.

The cross section of pipe which has been subject to severe corrosion appears in Figure 13. Again the lower line stays true to its helical form while the upper line indicates the severity of the pitting.

Figure 14:
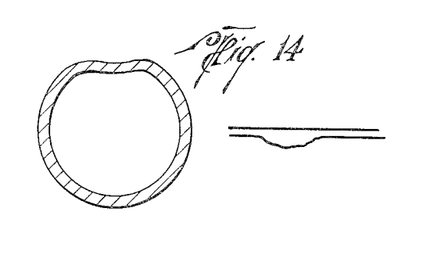
Figure 14 is a cross sectional view of pipe which has been crushed inward on one side, together with the caliper's indication of that defect.

A dented pipe is shown in cross section in Figure 14. In this instance, the upper line remains true to its helical form because the feelers which do not engage the dent are subjected to no lateral movement as the dent is passed. Since these feelers are the outermost feelers and thereby control the upper line, no variation appears in that line. The feelers which engage the dent, however, are moved inward. The innermost feeler controls the lower line and causes it to be deflected downward so that the two lines together form the pattern illustrated in Figure 14. It is significant to note that no previously existing caliper indicates any response whatsoever to this condition.

When production tubing is permitted to support its own weight at the bottom of the hole, the lower joints of tubing bear the compressive load of the entire string of tubing which may be four miles or more long. In such cases, and in other instances such as where production tubing passes a comparatively sharp bend in the hole, the joints of tubing bend and may assume various bowed forms. Generally, the extra stiffening provided by the collars at the connection of two lengths of pipe cause the portions of the pipe adjacent such connections to be comparatively straight. The bulk of the bending is therefore found between the connections.

Figure 15:
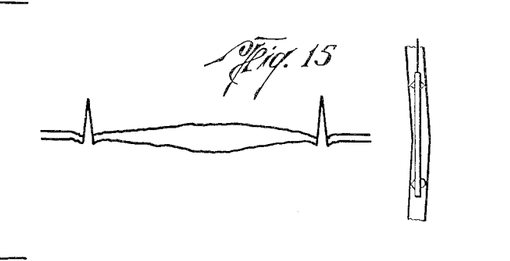
Figure 15 is an elevational section of tubing bowed in one direction, such as is often caused by a crooked hole, together with the caliper's indication of that defect.

The caliper is most conveniently constructed to be on the order of 5 feet in length. Hence, when a bend is encountered, the two ends of the caliper are forced to one side of the pipe, i. e., the outside of the bend, while the center of the caliper may be scraping the opposite side, i. e., the inside of the bend. Figure 15 illustrates such a bend in a length of pipe, together with the caliper therein.

The feelers are near the end of the caliper. Those feelers which are toward the outside of the bend are forced inward, thereby deflecting the lower line downward from its true helical path. Those feelers which are toward the inside of the bend extend outward, thereby deflecting the upper line upward from its true helical path. The chart indication therefore assumes the form shown in Figure 15. No previously known caliper gives a positive and identifiable indication of this bowed condition.

Figure 16:
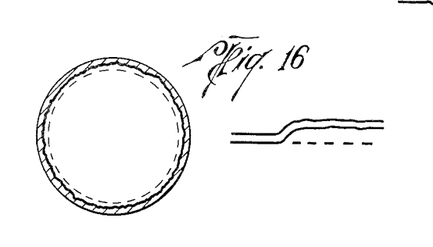
Figure 16 is a cross sectional view of general circumferential corrosion together with the caliper's indication of that defect.

General, overall circumferential corrosion throughout a substantial length of the pipe provides a chart indication as shown in Figure 16. This is a serious condition demanding removal of the subject length of pipe. Previously known calipers often give the same indication for the conditions shown in both Figures 15 and 16. When such calipers are used, it is necessary for the well operator to hope the indication is one of bowed tubing and assume the risk of tube failure, or to incur the expense of pulling a whole string of pipe to replace a length which may be somewhat bent but entirely sound.

Figure 17:
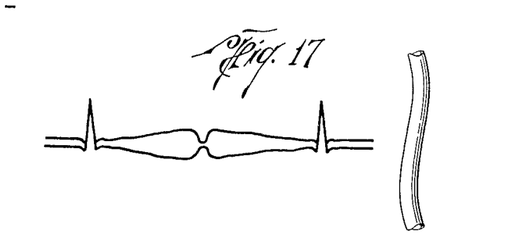
Figure 17 is an elevational section of S bowed tubing together with the caliper's indication of that defect.

Occasionally the weight supported by a length of tubing near the bottom of the hole, or some other circumstance, causes a length of tubing to become badly bowed into S form. In accordance with this invention, the indication of this condition is as shown in Figure 17. No definitely identifiable indication of this condition is obtained from any previously known caliper.

Scale deposits often occur on production tubing. Such deposits often signify that the base metal of the pipe has been subjected to a chemical reaction with chemicals in the well fluids, with the result that the base metal of the pipe may be almost entirely destroyed. Some previously known calipers are responsive to this condition, but the indication cannot be distinguished from indications of other conditions. No previously existing caliper affords accurate and definite diagnosis of this serious defect.

Figure 18:
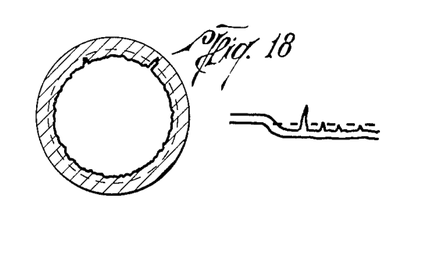
Figure 18 is a cross sectional view of pipe on which scale has been deposited all around the circumference, but showing pits in the scale, at least one of which pits extends into the metal, together with the caliper's indication of that defect.

When the caliper herein described passes over such general scaling, all feelers move inward causing both lines to deflect downward from their true helical path as shown in Figure 18. This provides a positive identification of the scale. Further, pits in the scale are indicated by pips in the upper line. When such a pip extends above the upper true helix, there is a positive indication of destruction of base metal to the depth indicated by the height of the pip.

In accordance with this invention, infinite varieties of combinations of these and other conditions may be detected and identified, whereas previously known instruments either fail to indicate any abnormal condition or give an indication which cannot be accurately and positively diagnosed.

The embodiment shown and described is purely illustrative and modifications may be made therein without departing from the spirit and scope of the invention. Therefore, the description is to be construed as illustrative only and should not be construed to restrict the invention as defined in the following claim.

For use in a caliper tool including an elongated housing, including a recorder comprising a movable chart and two movable stylus and driving means therefor, and including also a plurality of independently mounted feelers and follower and linking mechanisms, the improvements characterized by said feelers being of leaf spring type wherein the upper ends of said feelers are secured to the normally upper end of said housing with the lower ends of said feelers protruding radially outward from said housing, and further characterized by improved follower and linking mechanism comprising an independently mounted follower for each of said feelers, each of said followers being adapted for reciprocal movement in response to radial movement of one of said feelers, said followers being arranged substantially in a circle, and each of said followers having a down bearing surface and an up bearing surface; a first spindle positioned within said housing and adapted for reciprocal motion parallel to the axis of said housing; a first collar secured to the upper end of said first spindle, said first collar being positioned to engage the downward bearing surface of said followers and to have its position determined by the lowermost of said downward bearing surfaces at any given time; resilient means for urging said first spindle upward; a first offset secured to the lower end of said spindle; a first arm depending from said first offset; a first pivot pin secured to said housing; a first rocker arm pivotally mounted on said pivot pin, said first rocker arm having the first end thereof secured to said depending arm; a first stylus rod upon which the first of said stylus is mounted, the upper end of said first stylus rod being positioned in contact with the second end of said rocker arm and being adapted to be moved thereby; a second spindle with a second collar secured thereto and positioned to engage the upward bearing surface of said follower and to have its position determined by the uppermost of said upward bearing surfaces at any given time; said second spindle being tubular in form and being positioned concentrically around said first spindle; resilient means for urging said second spindle downward; a second offset secured to the lower end of said second spindle; a second arm depending from said second offset; a second pivot pin secured to said housing; a second rocker arm pivotally mounted on said second pivot pin, said second rocker arm having the first end thereof secured to said second depending arm; a second stylus rod upon which the second of said stylus is mounted, the upper end of said second stylus rod being positioned in contact with the second end of said second rocker arm and being adapted to be moved thereby; resilient means for urging each of said stylus rods upward into contact with the second ends of their respective rocker arms; the parts of each linkage from the collar through the stylus rod and stylus being proportioned so that the mass of that portion of the linkage above the pivot pin is equal to the mass of that portion of the linkage below the pivot pin, whereby accelerations of the caliper tool do not tend to activate the linkages.

References Cited in the file of this patent

UNITED STATES PATENTS

| | | |
|---|---|---|
| 2,102,080 | Kinley | Dec. 14, 1937 |
| 2,267,110 | Kinley et al. | Dec. 23, 1941 |
| 2,578,236 | Fredd | Dec. 11, 1951 |
| 2,596,924 | Fredd | May 13, 1952 |